US009919664B2

United States Patent
Vucelic et al.

(10) Patent No.: US 9,919,664 B2
(45) Date of Patent: Mar. 20, 2018

(54) VEHICLE FUEL MILEAGE DETERMINING SYSTEM

(71) Applicant: Nissan North America, Inc., Franklin, TN (US)

(72) Inventors: Petar Vucelic, Wixom, MI (US); Roger Bredernitz, Highland, MI (US); Adam Wehner, South Lyon, MI (US); Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/193,608

(22) Filed: Jun. 27, 2016

(65) Prior Publication Data

US 2017/0369009 A1    Dec. 28, 2017

(51) Int. Cl.
*G01F 23/00*    (2006.01)
*B60K 35/00*    (2006.01)
*B60R 16/023*    (2006.01)

(52) U.S. Cl.
CPC .......... *B60R 16/0236* (2013.01); *B60K 35/00* (2013.01); *G01F 23/00* (2013.01)

(58) Field of Classification Search
CPC ...... B60R 16/0236; B60K 35/00; G01F 23/00
USPC ........................................................ 701/123
See application file for complete search history.

(56) References Cited

U.S. PATENT DOCUMENTS

| | | | | |
|---|---|---|---|---|
| 5,505,076 A * | 4/1996 | Parkman | ................. | G01F 9/008 73/114.52 |
| 6,092,021 A * | 7/2000 | Ehlbeck | ................... | G01L 3/26 701/123 |
| 6,830,121 B1 * | 12/2004 | Johnson | .............. | F02D 41/0007 180/170 |
| 6,975,217 B2 | 12/2005 | Endoh | | |
| 7,206,720 B2 * | 4/2007 | LaPant | ................... | B60K 15/06 701/123 |
| 7,772,970 B2 | 8/2010 | Masuda et al. | | |
| 8,442,783 B2 * | 5/2013 | Piszko | .................... | G01F 9/008 137/558 |
| 8,755,994 B2 * | 6/2014 | Gilman | ............. | B60W 50/0097 340/438 |
| 8,928,473 B2 * | 1/2015 | Gilchrist | ................ | B60K 15/04 340/425.5 |

(Continued)

*Primary Examiner* — Atul Trivedi
(74) *Attorney, Agent, or Firm* — Global IP Counselors, LLP

(57) ABSTRACT

A vehicle fuel mileage determining system includes a fuel consumption measuring device, a distance measuring device, a display configured to display fuel mileage data and a controller. The controller is coupled to the fuel consumption measuring device, the distance measuring device and the display. The controller is configured to calculate fuel mileage data using baseline data, data from the fuel consumption measuring device and data from the distance measuring device. The controller further shows the fuel mileage data calculated on the display. The controller is further configured to determine the baseline data as follows: in response to a reset condition being detected, the controller defines the baseline data as being equal to initial factory settings; and in response to the reset condition not being detected, the controller defines the baseline data as being equal to previously determined fuel and distance data.

10 Claims, 4 Drawing Sheets

(56) References Cited

U.S. PATENT DOCUMENTS

| | | | | |
|---|---|---|---|---|
| 9,367,972 B2 * | 6/2016 | Ulrey | ............ | G07C 5/0816 |
| 2003/0195676 A1 * | 10/2003 | Kelly | ............ | G07C 5/008 |
| | | | | 701/31.4 |
| 2007/0129878 A1 * | 6/2007 | Pepper | ............ | B60W 40/12 |
| | | | | 701/123 |
| 2011/0140877 A1 * | 6/2011 | Gilchrist | ............ | B60K 15/04 |
| | | | | 340/450.2 |
| 2014/0279535 A1 * | 9/2014 | Fadler | ............ | G06Q 20/40 |
| | | | | 705/44 |
| 2015/0302670 A1 * | 10/2015 | Ulrey | ............ | G07C 5/0816 |
| | | | | 701/123 |

\* cited by examiner

VEHICLE FUEL MILEAGE DETERMINING SYSTEM

BACKGROUND

Field of the Invention

The present invention generally relates to a vehicle fuel mileage determining system. More specifically, the present invention relates to a vehicle fuel mileage determining system that includes initial factory settings used upon initialization of the system, or a condition where the system has been reset, in order to display Average Fuel Economy data on a display until sufficient distance data and fuel consumption data has been accumulated to accurately calculate the Average Fuel Economy data.

Background Information

Most vehicle include systems controlled by microcomputers often referred to as controllers and include volatile memory that loses stored data upon loss of power. Upon initialization (first usage) of the controller, systems such as a fuel mileage determining systems, lack data relating to, for example, fuel consumption and distances traveled. Such data is not accumulated until after the vehicle has been driven for an extended period of time.

SUMMARY

One object of the present disclosure is to provide a vehicle controller with initial factory settings used to assist the controller in providing accurate data to a vehicle driver relating to displaying Average Fuel Economy data, in particular when the vehicle is new or has undergone a reset condition.

In view of the state of the known technology, one aspect of the present disclosure is to provide a vehicle fuel mileage determining system with a fuel consumption measuring device, a distance measuring device, a display configured to display fuel mileage data and a controller. The controller is coupled to the fuel consumption measuring device, the distance measuring device and the display. The controller is configured to calculate fuel mileage data using baseline data, data from the fuel consumption measuring device and data from the distance measuring device. The controller further shows the fuel mileage data calculated on the display. The controller is further configured to determine the baseline data as follows: in response to a reset condition being detected, the controller defines the baseline data as being equal to initial factory settings; and in response to the reset condition not being detected, the controller defines the baseline data as being equal to previously determined fuel and distance data.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
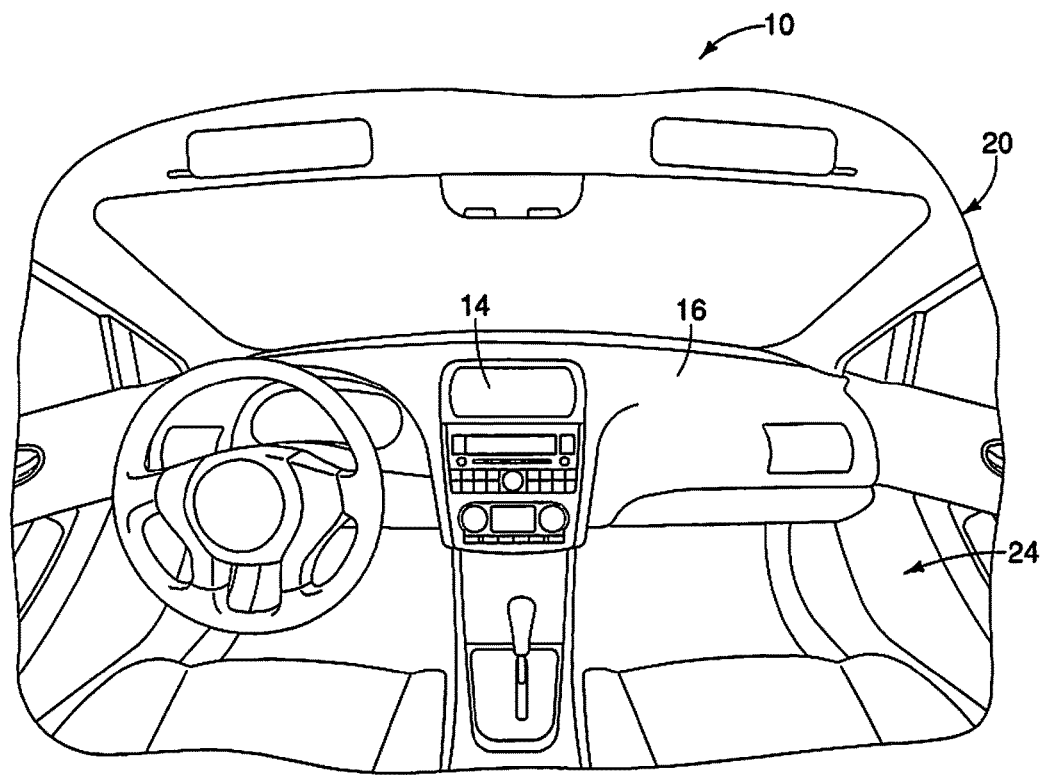
FIG. 1 is a plan view of a passenger compartment of a vehicle showing an instrument panel that includes a display that displays vehicle information, including calculated fuel mileage data in accordance with a first embodiment.
Figure 2:
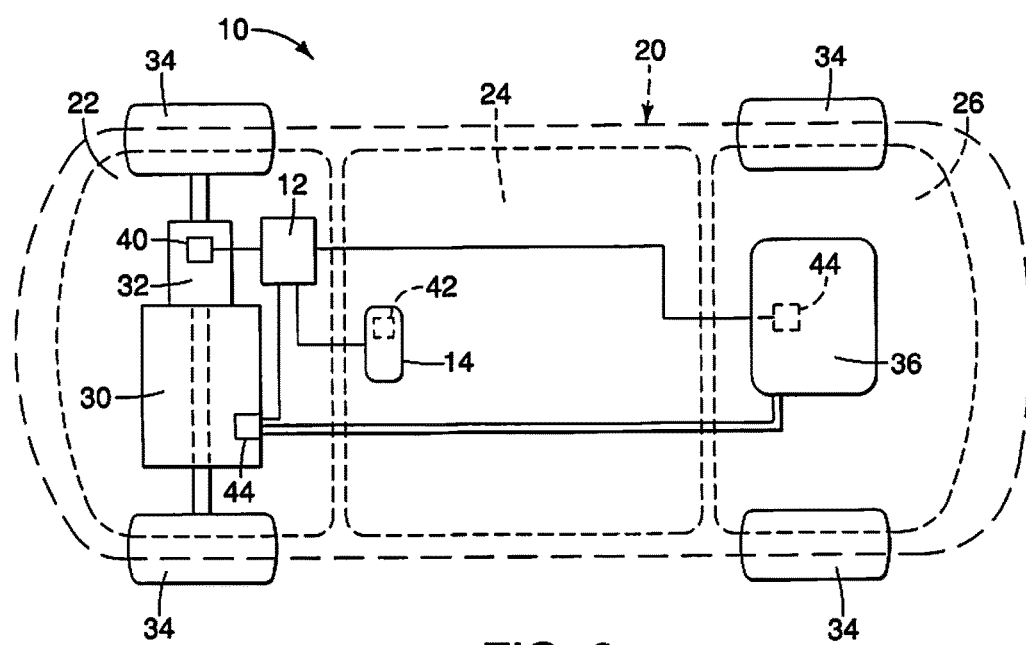
FIG. 2 is a schematic view of the vehicle showing an engine, a transmission, wheels, a controller, the display and a fuel tank in accordance with the first embodiment.

Referring initially to FIGS. 1 and 2, a vehicle 10 is illustrated in accordance with a first embodiment. The vehicle 10 includes a controller 12 (FIG. 2) that is configured to calculate and show data on a display 14 on an instrument panel 16 within the vehicle 10, where the data corresponds to fuel consumption and mileage traveled and indicating fuel mileage in miles per gallon (mpg) or kilometers per liter (kmpl) of the vehicle 10.

As shown in FIG. 2, the vehicle 10 includes, among other features and components, a vehicle body structure 20 that defines an engine compartment 22, a passenger compartment 24 and a storage compartment 26 (also referred to as a trunk). The vehicle 10 also has an engine 30, a transmission 32, wheels 34 and a fuel tank 36. In FIG. 2, the controller 12 is depicted as being within the engine compartment 30 but can alternatively be installed within the passenger compartment 24, or any convenient location on or within the vehicle body structure 20. As shown in FIG. 1, the instrument panel 16 is located within the passenger compartment 24 and the display 14 is located on the instrument panel 24 in a prominent location for viewing by a vehicle operator (not shown) and/or a vehicle occupant. The display 14 can be merely a video display or can include an inputting capability, such as buttons or a touch screen arrangement such that the display 14 serves as an interactive display allowing vehicle occupant input.

Figure 3:
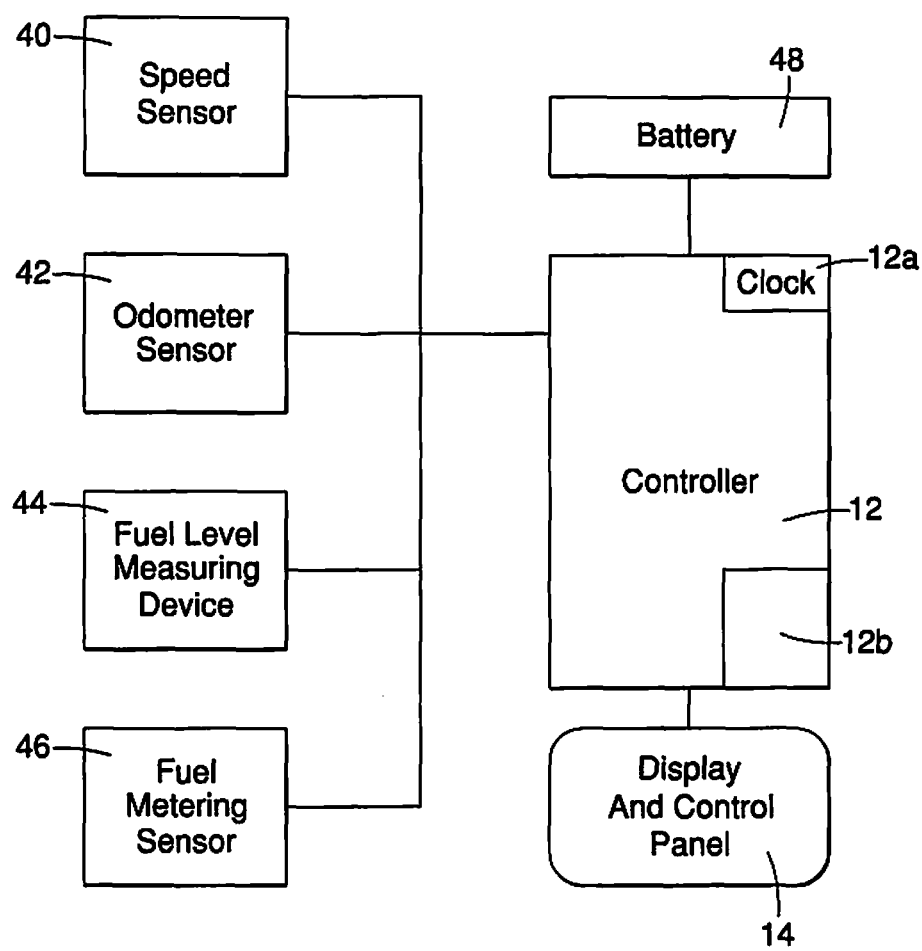
FIG. 3 is a block diagram of portions of the vehicle including the controller, a speed sensor, an odometer sensor, a fuel level measuring device, a fuel metering sensor, a battery and the display in accordance with the first embodiment.

As shown in FIGS. 2 and 3, the controller 12 is connected to the display 14, a speed sensor 40, an odometer sensor 42, a fuel level measuring device 44, a fuel metering sensor 46 and a battery 48. The speed sensor 40 can be installed in any of a plurality of locations, such as, for example, the transmission 32 and be configured to measure the speed of an output shaft of the transmission 32 thereby providing a direct indication of rotation of the wheels 34. Alternatively, the speed sensor 40 can detect speed readings from a speedometer (not shown) of an instrument cluster that is part of the instrument panel 16. The odometer sensor 42 is configured to detect distances traveled by the vehicle 10 and can also be within the transmission or connected to a conventional odometer within the instrument panel 16 or the display 14. The fuel level measuring device 44 is located within the fuel tank 36 and is configured to send signals to the controller 12 indicating the current level of fuel within the fuel tank 36, which in turn provides an indication of fuel consumed over time. The fuel metering sensor 46 is installed on the engine 30, and in particular can be part of the fuel delivery system (for example, a fuel injection assembly) if the engine 30. The fuel metering sensor 46 is configured to provide meter (measure) amounts of fuel delivered to the engine 30. The battery 48 is a conventional vehicle component that stores electric energy for use by the vehicle 10 and the controller 12 in a conventional manner.

The controller 12 is configured to process data from various sensors such as sensors on the engine 30, the transmission 32 and air conditioning system (not shown) related sensors. In other words, the controller 12 can be used for any of a variety of purposes in addition to the fuel consumption calculations described herein below.

With reference to the calculation of fuel mileage data described further below, the controller 12 can make use of data form any of a combination of sensor readings. For example, in the description below, the controller 12 monitors fuel consumption via a fuel consumption measuring device. The fuel consumption measuring device includes one or both of the fuel level measuring device 44 and the fuel metering sensor 46. In other words, the controller 12 can determine overall fuel consumption over time by monitoring the changes in the level of fuel in the fuel tank 36 via the fuel level measuring device 44. The fuel level measuring device 44 can be, for example, a float and float movement measuring device within the fuel tank 36. Since fuel level measuring devices, such as the fuel level measuring device 44 are conventional devices, further description is omitted for the sake of brevity. Alternatively the controller 12 can determine overall fuel consumption over time by monitoring the amounts of fuel provided to the engine 30 via the fuel metering sensor 46. Still further, the controller 12 can determine overall fuel consumption over time by monitoring the amounts of fuel provided to the engine 30 via the fuel metering sensor 46, in combination with use of data provided by the fuel level measuring device 44. Further, distance traveled can be calculated from the speed sensor data and tire diameter of the wheels 34.

The controller 12 also uses data collected from a distance measuring device that can be defined by the odometer sensor 42, which measures actual miles (or kilometers) traveled by the vehicle 10. The distance measuring device can also be defined by the speed sensor 40 combined with readings from a clock 12a within or associated with the controller 12. In other words, the controller 12 can collect measurements made by the speed sensor 40 and clock the speed of the vehicle 10 over time to determine distances traveled.

The display 14 can be configured to display a wide range of data sets. For example, the display 14 can be configured to display air conditioning system status, air conditioning related temperatures, tire pressure, engine codes, transmission codes, etc. However, in the present disclosure, the display 14 is configured to display fuel mileage data calculated by the controller 12. The fuel mileage data is also referred to herein below as Average Fuel Economy AFE.

The controller 12 includes the clock 12a and memory 12b that includes non-volatile memory that can permanently store data (for example, read only memory ROM, EPROM or other such data storage circuitry that can serve as permanent memory) and volatile electronic memory, hereinafter referred to as temporary memory, that stores data that can be saved (stored) and re-saved (for example, random access memory RAM, temporary memory) over time as deemed necessary by the controller 12. Hence, the non-volatile electronic memory of the memory 12b can permanently store data such information as basic programming commands and initial factory settings, while volatile memory temporarily stores data that is easily updated and/or replaced. The permanent memory (non-volatile memory) is unaffected by loss of battery power, whereas the temporary memory (volatile memory) can possibly lose data upon loss of battery power.

The controller 12 is configured to calculate fuel mileage data using several types of data: 1) baseline data; 2) data from the fuel consumption measuring device; and 3) data from the distance measuring device. A description of the calculating process is provided below. After calculating the fuel mileage data, the controller 12 causes the calculated fuel mileage data to be displayed on the display 14 in, for example, miles per gallon, or kilometers per liter. The controller 12 is further configured to determine the baseline data as follows: A) in response to a reset condition being detected, the controller defines the baseline data as being equal to initial factory settings; and B) in response to the reset condition not being detected, the controller defines the baseline data as being equal to previously determined fuel and distance data.

As used herein, a reset condition is one of three circumstances. The first circumstance is caused by a vehicle occupant initiating a predetermined operation using the display 14 causing the fuel mileage data to be reset or re-initialized. As described in greater detail below, when the fuel mileage data is reset or when there is a loss of battery power, all previously calculated data in temporary memory is deleted so that calculations for the fuel mileage data begin anew. For example, if the vehicle occupant is planning a long trip and wishes to know the fuel consumption and miles per gallon for the upcoming trip, the reset operation can be inputted by the vehicle occupant using the display 14.

Another reset condition is an initialization process. Specifically, when the vehicle 10 is first manufactured, the controller 12 has not been in operation long enough to acquire sufficient data to make reliable calculations using distance and fuel consumed to produce the fuel mileage data. Hence, initial usage of the vehicle 10 constitutes a reset condition as used herein. In this circumstance, initial factory settings are taken from permanent memory (non-volatile memory) and used to define the baseline data, as described in greater detail below.

Yet another reset condition is caused when the battery 48 is disconnected from the vehicle 10, and in particular, disconnected from the controller 12, and then later reconnected. When the battery 48 is disconnected from the controller 12, the temporary memory (volatile memory) that stores replaceable data is lost. Thus, an initialization process is necessary where initial factory settings are needed from ROM memory in order to define baseline data, as described in greater detail below.

The controller 12 determines the fuel mileage data as follows. First, the controller 12 collects distance data D from the distance measuring device (either the speed sensor 40 with clock 12a measurements or odometer readings from the odometer sensor 42) and fuel consumption data F from the fuel consumption measuring device (either the fuel level measuring device 44 or the fuel metering sensor 46). Thereafter, the controller 12 calculates the fuel mileage data (the Average Fuel Economy AFE) using the following equation:

$$\text{Fuel Mileage Data} = (D_1 + \Sigma_n \Delta D_n)/(F_1 + \Sigma_n \Delta F_n)$$

where
 $D_1$=Previously Saved distance Traveled (baseline data)
 $F_1$=Previously Saved Fuel Used (baseline data)
 $D_n$=Distance Traveled during a predetermined time interval (based on current distance data D)
 $F_n$=Fuel Used Since during a predetermined time interval (based on current fuel consumption data F)

$\Sigma_n \Delta D_n$ = sum of distances $D_1$ thru $D_n$ traveled $\Sigma_n \Delta F_n$ = sum of fuel used $F_n$ for each of the distances $D_1$ thru $D_n$ are traveled.

The above mentioned predetermined time intervals can vary from vehicle to vehicle. However in the depicted embodiments, the Fuel Mileage Data (the Average Fuel Economy AFE) can be re-calculated every 10 ms (milliseconds). The controller 12 receives data relating to each of the distance data D and the fuel consumption data F at least every 10 ms, if not more often. However, the predetermined time intervals can be anywhere from 1 ms to 30 ms.

Figure 4:
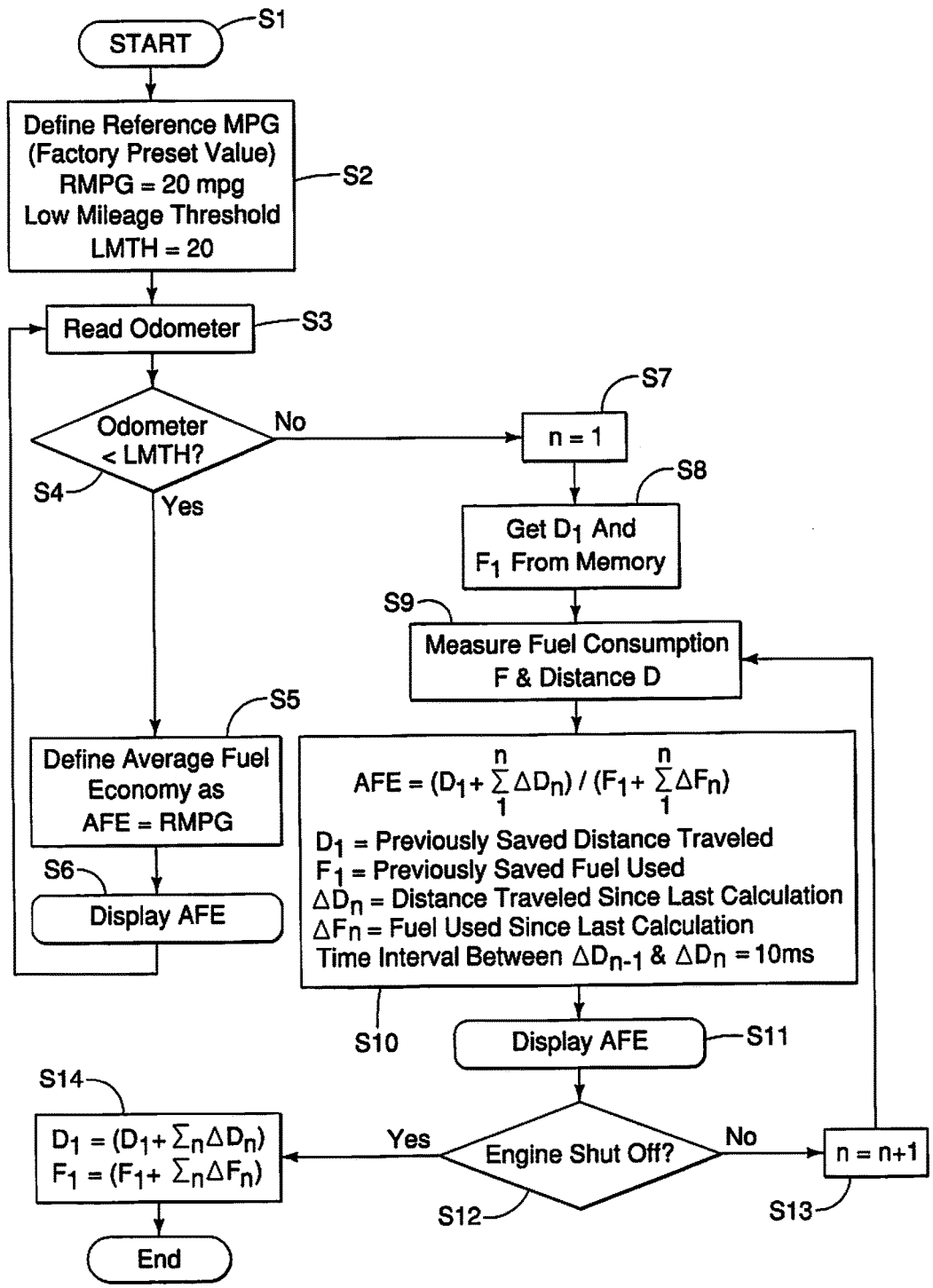
FIG. 4 is a flowchart showing logic used in the determination and calculation of fuel mileage date in accordance with the first embodiment.

A description of a first example of the logic used by the controller 12 in the determination of fuel mileage data (the Average Fuel Economy AFE) is now provided with specific reference to FIG. 4. In the first embodiment, every time the engine 30 of the vehicle 10 is started, the controller 12 reads the accumulated mileage from the odometer to see if the vehicle 10 has been driven a sufficient distance in order to accumulate a representative amount of data, or whether the vehicle 10 is so new (or has experienced a reset condition) that it has not yet had time to accumulate sufficient distance data and fuel consumption data. Specifically, upon engine 30 startup, the controller 12 compares the overall distance the vehicle 10 has traveled (the odometer reading) with a predetermined value (an initial factory setting). If that distance is below the predetermined value, then the controller 12 use the initial factory settings as baseline data where the Average Fuel Economy AFE is made equal to the baseline data (initial factory settings) for purposes of displaying the Average Fuel Economy AFE on the display 14.

In the first embodiment depicted in FIG. 4, the initial factory settings are determined on a vehicle-by-vehicle basis and therefore differ from vehicle model to vehicle model. For example, in a small compact vehicle with a small engine (such as a 1.5 liter engine) the tested average fuel economy for that vehicle can be, for example, between 30 and 40 mpg. For an SUV with a larger body design and larger engine, the tested average fuel economy can be, for example, between 20 and 25 mpg. In the example depicted in FIG. 4, a reference variable called RMPG (reference MPG) is one such tested average fuel economy calculation (an initial factory setting) that initially serves as the baseline data that initially defines the Average Fuel Economy AFE when the vehicle 10 is new or has experience a reset condition.

In FIG. 4 at step S1, the engine 30 of the vehicle 10 is started and the controller 12 begins collecting data from its corresponding attached sensors. At step S2, the controller 12 retrieves from its permanent memory baseline data in the form of the reference variable called RMPG (Reference MPG) as being, for example, 20 mpg (miles per gallon). The value of 20 mpg is determined previously for the particular model corresponding to the vehicle 10. The variable RMPG is initially used by the controller 12 for display on the display 14 as the Average Fuel Economy AFE. Also at step S2, the controller 12 retrieves from permanent memory a reference variable called LMTH (Low Mileage Threshold) as being, for example, 20 miles. It should be understood from the drawings and the description herein that LMTH can be any desired value from 10 to 100 miles or similar value for purposes of initializing the calculation of the Average Fuel Economy AFE.

At step S3, the controller 12 reads the accumulated miles registered on the odometer via the odometer sensor 42. Next at step S4, the controller 12 determines whether or not the odometer reading is less than the variable LMTH. If the odometer reading is less than LMTH, then operation moves to step S5 where the Average Fuel Economy AFE is made equal to the reference variable RMPG. Next at step S6, the value of the Average Fuel Economy AFE is displayed on the display 14. Operation then moves back to step S3 where the odometer is read again.

At step S4, if the controller 12 determines that the odometer reading is not less than LMTH, then operation moves to step S7. At step S7, a counter n used by the controller 12 is made equal to 1 (n=1).

Next at step S8, the controller 12 retrieves the value of variables $D_1$ and $F_1$ from the temporary memory, if previously stored (see step S14). Hereinafter, the variables $D_1$ and $F_1$ define the baseline data. At step S9, the controller 12 retrieves current data from the fuel consumption measuring device and the distance measuring device. Next, at step S10, the controller 12 calculates the Average Fuel Economy AFE as per the equation:

$$AFE = (D_1 + \Sigma_n \Delta D_n)/(F_1 + \Sigma_n \Delta F_n)$$

Next at step S11, the Average Fuel Economy AFE is displayed on the display 14. At step S12, the controller 12 determines whether or not the engine 30 has been shut off. If the engine 30 has not been shut off, then operation moves to step S13 where the counter n is incremented up a digit (n=n+1). Operation then returns to step S9 for a further repeated iterations of the logic in the flowchart.

At step S12, if the controller 12 determines that the engine 30 has been shut off, then operation moves to step S14. At step S14 the current accumulated values of distance and fuel data are saved in temporary memory. Specifically, $D_1$ and $F_1$ are saved as follows:

$$D_1 = (D_1 + \Sigma_n \Delta D_n), \text{ and}$$

$$F_1 = (F_1 + \Sigma_n \Delta F_n).$$

The next time the vehicle 10 is driven, the values of $D_1$ and $F_1$ are retrieved in step S8 and define the baseline data.

Using the above logic, the display 14 displays either the initial factory setting (the reference variable RMPG) as the Average Fuel Economy AFE until sufficient fuel and distance data have been accumulated by the controller 12. Once sufficient fuel and distance data have been accumulated by the controller 12, a calculated Average Fuel Economy AFE is displayed on the display 14.

Second Embodiment

Figure 5:
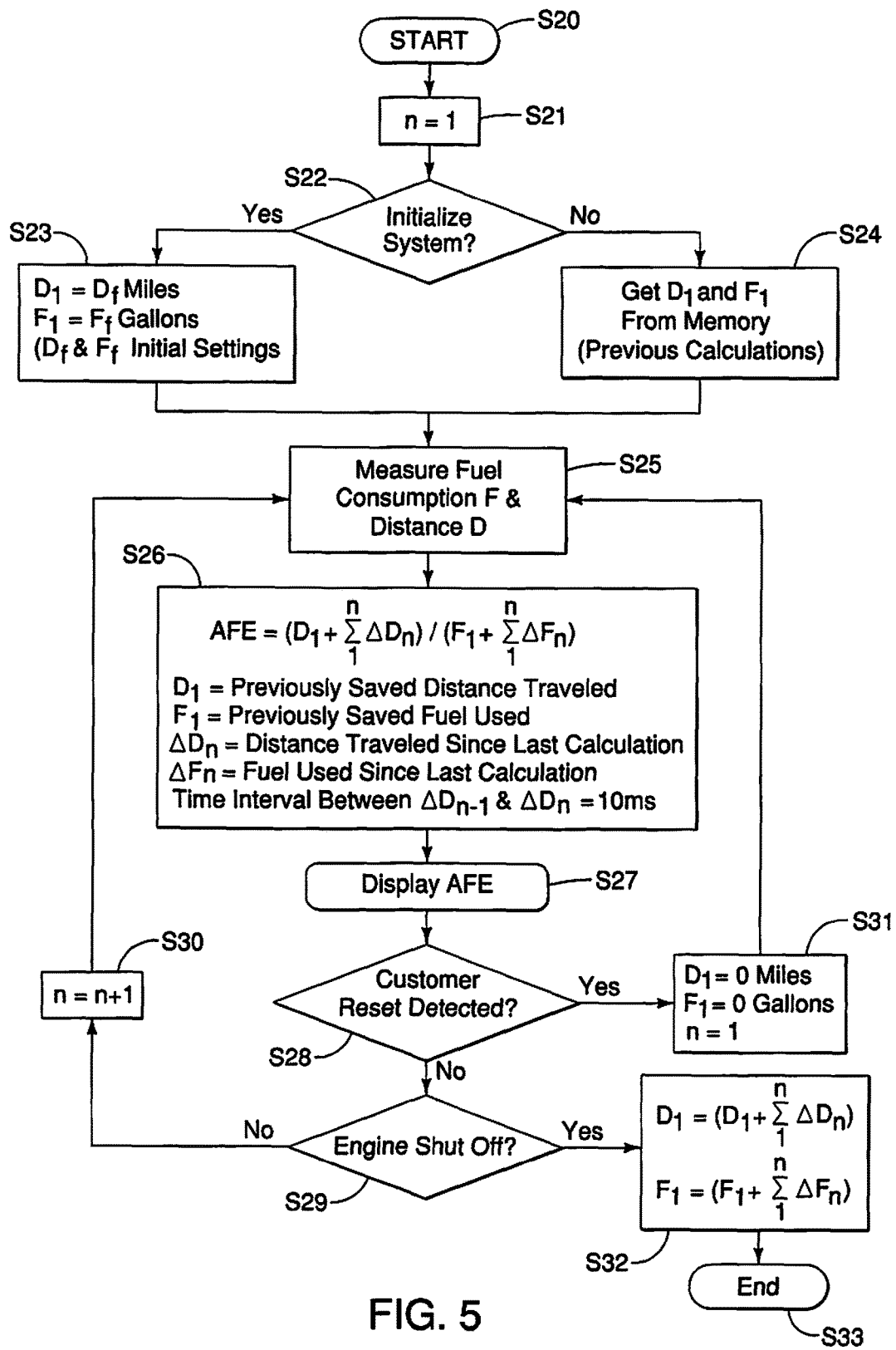
FIG. 5 is a flowchart showing logic used in the determination and calculation of fuel mileage date in accordance with a second embodiment.

Referring now to FIG. 5, a flowchart in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

At step S20 in FIG. 5, the engine 30 is started and the controller 12 begins operating. At step S21, a counter n is made equal to 1 (n=1). At step S22, the controller 12 determines whether or not initialization is necessary. For example, if the controller 12 determines that the battery 48 was disconnected (a reset condition) from the vehicle 10 leaving the controller 12 without power, the controller 12 determines that initialization is necessary. Operation then moves to step S23 where the variable $D_1$ is made equal to $D_f$ miles and the variable $F_1$ is made equal to $F_f$ gallons. The values of variables $D_1$ and $F_1$ as set in step S23 initially define the baseline data used for the calculations of the Average Fuel Economy AFE (described further below). Specifically, the values of $D_f$ miles and $F_f$ gallons are initial factory settings stored in permanent memory of the controller 12. The values of $D_f$ miles and $F_f$ gallons that provide the controller 12 with the basis for an initial calculation of the Average Fuel Economy AFE that will be equal to the factory determined value of the Average Fuel Economy AFE for the specific model corresponding to the vehicle 10. By using the values of $D_f$ miles and $F_f$ gallons, the controller 12 can display a factory preset value of the Average Fuel Economy AFE initially and measured values of distance traveled and fuel used are subsequently added to the factory preset values.

After step S23, operation moves to step S25. Returning to step S22, if the controller 12 determines that the system does not require initialization (for example, the battery 48 has not been disconnected from the vehicle 10), then operation moves to step S24 where the previously saved values of $D_1$ and $F_1$ are retrieved from the temporary memory of the controller 12. The values of $D_1$ and $F_1$ set in step S24 now define the baseline data. The values of $D_1$ and $F_1$ are saved at step S32 (described below).

Next, operation moves to step S25 where current fuel consumption F and current distance traveled D are retrieved from the fuel consumption measuring device and the distance measuring device. Next, at step S25, the controller 12 calculates the Average Fuel Economy AFE as per the equation:

$$AFE=(D_1+\Sigma_n\Delta D_n)/(F_1+\Sigma_n\Delta F_n)$$

The equation above for calculating the Average Fuel Economy AFE is identical to the equation described above in the first embodiment. Therefore a description of the calculations for the Average Fuel Economy AFE is omitted for the sake of brevity.

Next at step S27, the Average Fuel Economy AFE is displayed on the display 14.

At step S28, the controller 12 determines whether or not the vehicle operator has manipulated a reset switch or touch screen instruction on the display 14 requesting that the Average Fuel Economy AFE be reset to zero so that the calculated Average Fuel Economy AFE is newly and freshly determined. If no reset has been requested by the vehicle operator (a customer) then operation moves to step S29.

At step S29, the controller determines whether or not the engine 30 has been shut off. If the engine has not been shut off, then operation moves to step S30 where the counter n is incremented up one value (n=n+1). Thereafter, operation moves to step S25 for a further repeated iterations of the logic in FIG. 5.

At step S28, if a reset has been requested by the vehicle operator (a customer) then operation moves to step S31 here the variable $D_1$ and variable $F_1$ are both made equal to zero and the counter n is made equal to 1 (n=1). Thereafter, operation returns to step S25 where the calculations for the Average Fuel Economy AFE begin fresh with only measured distance data and measured fuel consumption data being used for the calculations of the Average Fuel Economy AFE.

At step S29, if the controller 12 determines that the engine 30 has been shut off, then operation moves to step S32 where $D_1$ and $F_1$ are saved in temporary memory for use at step S24 the next time the vehicle 10 is used. Specifically, the following values:

$$D_1=(D_1+\Sigma_n\Delta D_n), \text{ and}$$

$$F_1=(F_1+\Sigma_n\Delta F_n).$$

are saved so that they can be used the next time the vehicle 10 is used.

Using the logic presented in FIG. 5, the controller 12 can initially display on the display 14, an Average Fuel Economy AFE based on baseline initial factory settings ($D_f$ and $F_f$) and measured values of distance traveled and fuel used are subsequently added to the baseline initial factory settings.

The controller 12 preferably includes a microcomputer with a vehicle control program that controls the display 14 and performs the calculations as discussed above. The controller 12 can also include other conventional components such as an input interface circuit, an output interface circuit, and storage devices such as a ROM (Read Only Memory) device and a RAM (Random Access Memory) device. The microcomputer of the controller 12 is programmed to control the display 14 and perform the calculations as discussed above. The memory circuit stores processing results and control programs such as ones for sensor data retrieval operations and calculations that are run by the processor circuit. The controller 12 is operatively coupled to the various sensors and vehicle components in a conventional manner. The internal ROM of the controller 12 stores the steps and interface communications and calculations for various operations. It will be apparent to those skilled in the art from this disclosure that the precise structure and algorithms for the controller 12 can be any combination of hardware and software that will carry out the functions of the present invention.

The various vehicle elements and components are conventional components that are well known in the art. Since vehicles and their various elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the fuel mileage determining system. Accordingly, these terms, as utilized to describe the present invention should be interpreted relative to a vehicle equipped with the fuel mileage determining system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle fuel mileage determining system, comprising:
a fuel consumption measuring device;
a distance measuring device;
a display configured to display fuel mileage data; and
a controller coupled to the fuel consumption measuring device, the distance measuring device and the display, the controller being configured to determine fuel mileage data using baseline data, data from the fuel consumption measuring device and data from the distance measuring device, and show the fuel mileage data determined by the controller on the display, the controller being further configured to determine the baseline data as follows:
in response to a reset condition being detected, the controller defines the baseline data as being equal to an initial factory setting that is a predetermined number greater than zero defined by a tested average fuel economy for a vehicle that includes the vehicle fuel mileage determining system, and
in response to the reset condition not being detected, the controller defines the baseline data as being equal to a value from previously determined fuel and distance data of the vehicle.

2. The vehicle fuel mileage determining system according to claim 1, wherein the distance measuring device includes an odometer sensor that detects distances measured by a vehicle odometer over time.

3. The vehicle fuel mileage determining system according to claim 1, wherein the fuel consumption measuring device is a fuel metering sensor.

4. The vehicle fuel mileage determining system according to claim 1, wherein the fuel consumption measuring device is a fuel level measuring device.

5. The vehicle fuel mileage determining system according to claim 1, further comprising:
a battery within the vehicle, the battery being coupled to the controller, wherein
the controller is configured such that in response to determining that the battery has been dis-connected and thereafter re-connected to the vehicle, the controller determines that the reset condition has been detected.

6. The vehicle fuel mileage determining system according to claim 1, wherein
the controller is configured such that in response to determining that an odometer reading is below a predetermined value, the controller determines that the reset condition has been detected.

7. The vehicle fuel mileage determining system according to claim 1, wherein
the display includes a control panel with a reset switch that is coupled to the controller, wherein
the controller is configured such that in response determine that the reset switch has been operated, the controller determines that the reset condition has been detected.

8. The vehicle fuel mileage determining system according to claim 1, wherein
the controller calculates the fuel mileage data using the following equation:

Fuel Mileage Data = $(D_1 + \Sigma_n \Delta D_n)/(F_1 + \Sigma_n \Delta F_n)$ where
$D_1$ = the baseline data
$F_1$ = the baseline data
$D_n$ = Distance Traveled during a predetermined time interval
$F_n$ = Fuel Used Since during a predetermined time interval
$\Sigma_n \Delta D_n$ = sum of distances $D_n$ traveled
$\Sigma_n \Delta F_n$ = sum of fuel used $F_n$ as the distances $D_n$ are traveled.

9. The vehicle fuel mileage determining system according to claim 8, wherein
the predetermined time interval is between 1 and 30 ms.

10. The vehicle fuel mileage determining system according to claim 9, wherein
the predetermined time interval is 10 ms.

* * * * *